Nov. 9, 1937.                L. C. REYNOLDS                2,098,359
                             TABULATING MACHINE
                         Filed Dec. 5, 1930          5 Sheets-Sheet 1
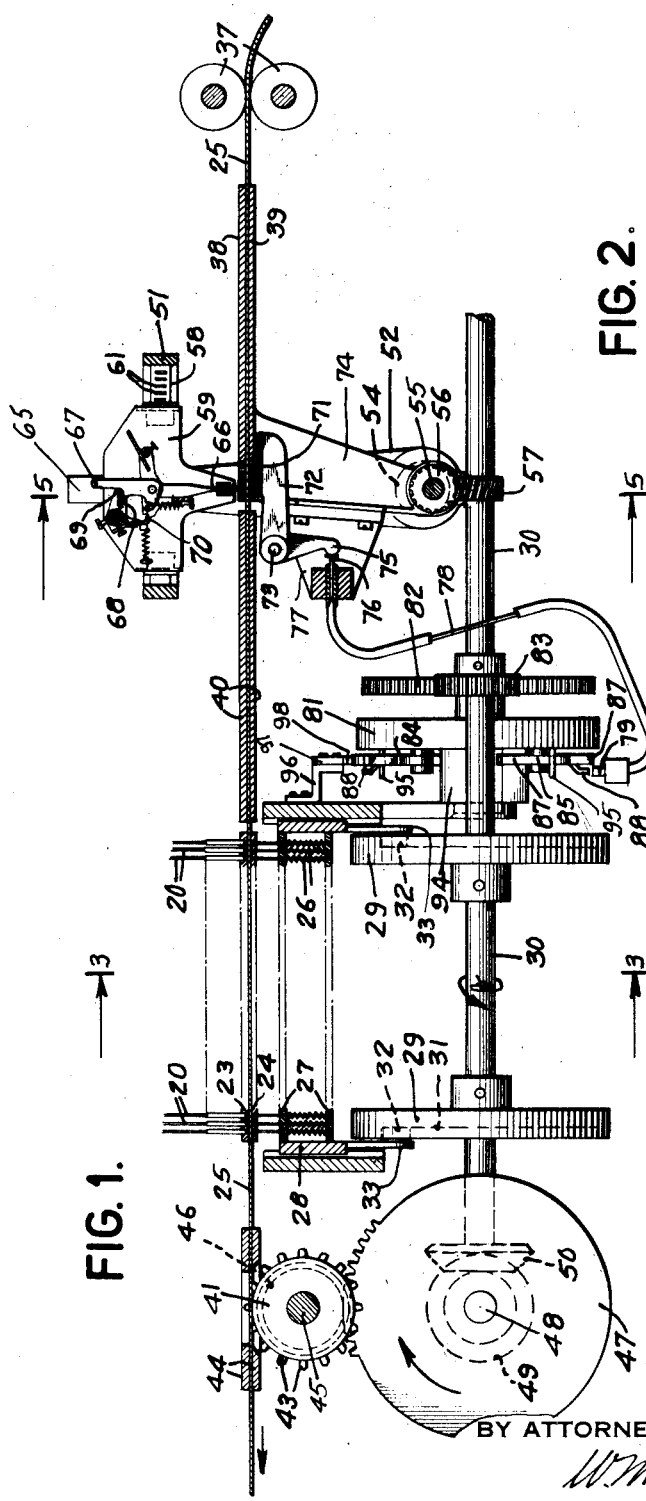
INVENTOR
L. C. Reynolds
BY ATTORNEY
W. M. Wilson

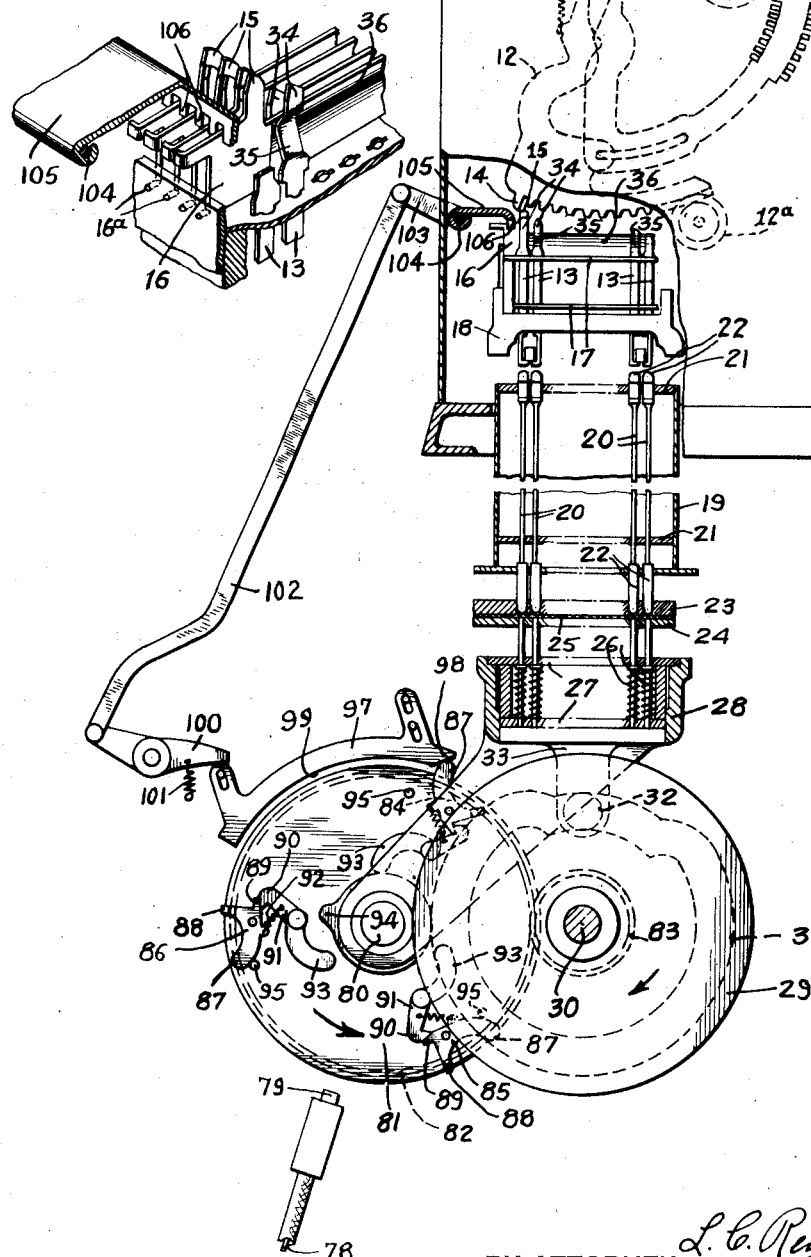

Nov. 9, 1937.                L. C. REYNOLDS                2,098,359
                          TABULATING MACHINE
                         Filed Dec. 5, 1930           5 Sheets-Sheet 3
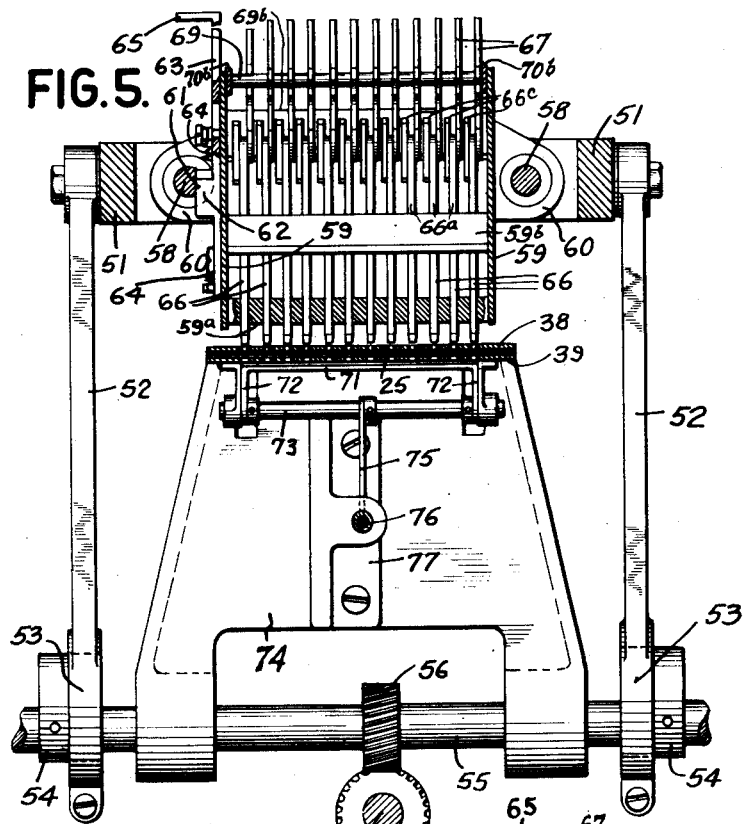
FIG. 5.
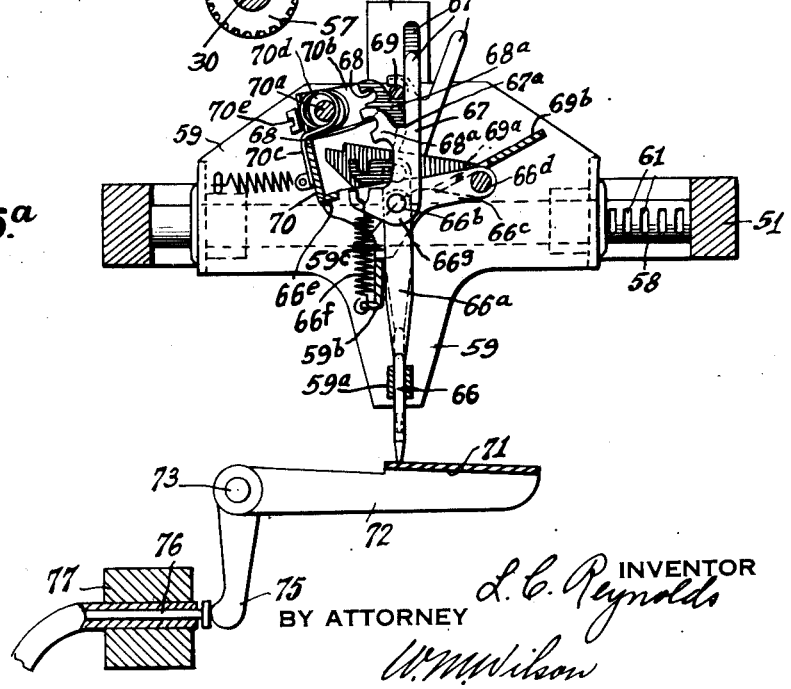
FIG. 5.ª
INVENTOR
L. C. Reynolds
BY ATTORNEY
W. M. Wilson Nov. 9, 1937.  L. C. REYNOLDS  2,098,359
TABULATING MACHINE
Filed Dec. 5, 1930   5 Sheets-Sheet 4

INVENTOR
L. C. Reynolds
BY ATTORNEY
W. M. Wilson

Nov. 9, 1937.   L. C. REYNOLDS   2,098,359
TABULATING MACHINE
Filed Dec. 5, 1930   5 Sheets-Sheet 5
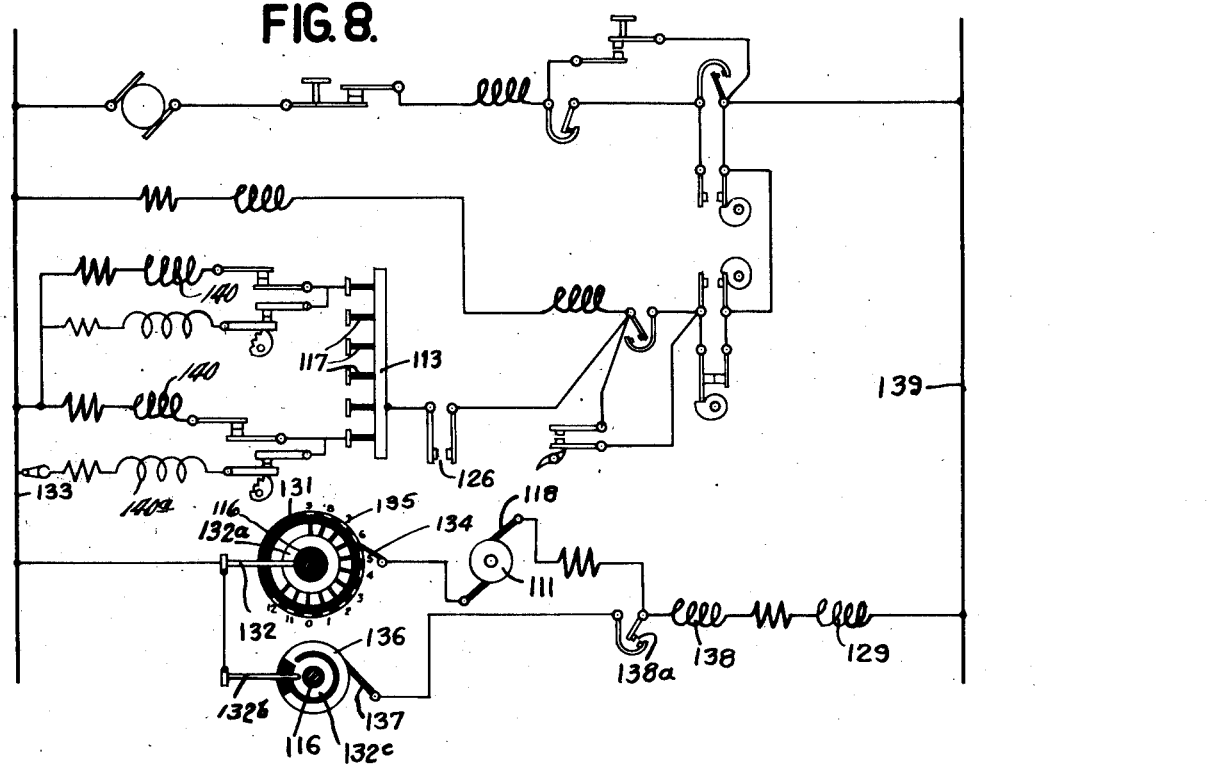

Patented Nov. 9, 1937

2,098,359

UNITED STATES PATENT OFFICE 2,098,359

TABULATING MACHINE

Lynus Clyde Reynolds, Sweetwater, Tenn., assignor, by mesne assignments, to International Business Machines Corporation, New York, N. Y., a corporation of New York Application December 5, 1930, Serial No. 500,234

10 Claims. (Cl. 235—61.7)

The present invention relates generally to record controlled accounting and statistical machines and is directed largely toward improvements in the control mechanisms for such machines which heretofore have been controlled in most instances by perforated record cards.

The main object of this invention is to provide novel and improved mechanisms for controlling any well-known card controlled accounting and statistical machine by means of a perforated record strip, the said record strip controlled mechanisms being designed to be attached to such machines without requiring extensive alterations in the structure of the machine as a whole.

Another object is to provide mechanism controlled by data designations on the record strip to determine whether or not items corresponding to a particular data designation or group identifying number are to be tabulated.

Various other objects, advantages, or features of this invention will be pointed out in the following specification and claims or will be apparent from a study thereof and of the accompanying drawings.

The drawings illustrate two ways in which the objects stated above may be attained, however, it is to be understood that it may be embodied in accounting and tabulating machines of other types than the ones illustrated and in various ways without going beyond the bounds of the claims set forth hereinafter.

In said drawings:

Fig. 1 is a vertical elevation partly in section illustrating diagrammatically the construction and arrangement of the present invention as applied to a tabulating machine of the type described in Letters Patent No. 1,245,502.

Fig. 2 is a specimen of the record tape used to control the operation of the machine.

Fig. 3 is a vertical side elevation partly in section of the machine shown diagrammatically in Fig. 1, the section being taken on the line 3—3 of Fig. 1.

Fig. 4 is a perspective view of the mechanism for preventing operation of the tabulating mechanism.

Fig. 5 is a vertical section through the analyzer taken substantially on the line 5—5 of Fig. 1.

Fig. 5a is an enlarged view showing in vertical section and in operated position certain parts above the tape in Fig. 1.

Fig. 8 is a diagram of the connections of a Hollerith electric tabulating machine in which the present invention has been embodied.

Fig. 9 is a detail view of the mechanism for disabling the accumulating and printing mechanism of a Hollerith electric tabulating machine when it is not desired to tabulate the information in a given section of the perforated tape.

Figure 6:
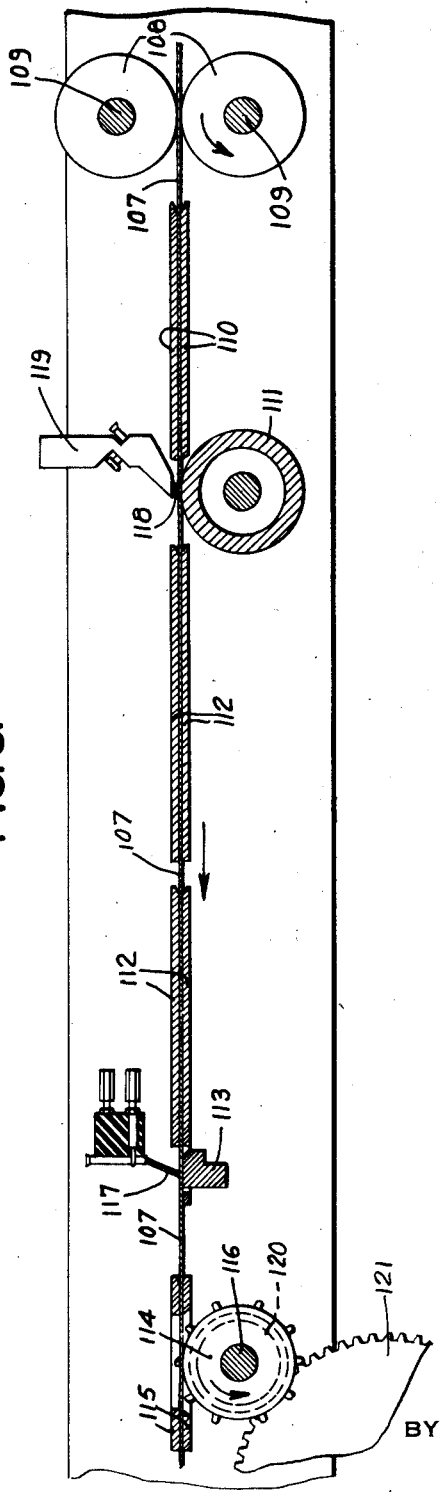
Fig. 6 is a vertical section of a modification illustrating how the invention may be applied to the well-known Hollerith electric tabulating machine.
Figure 7:
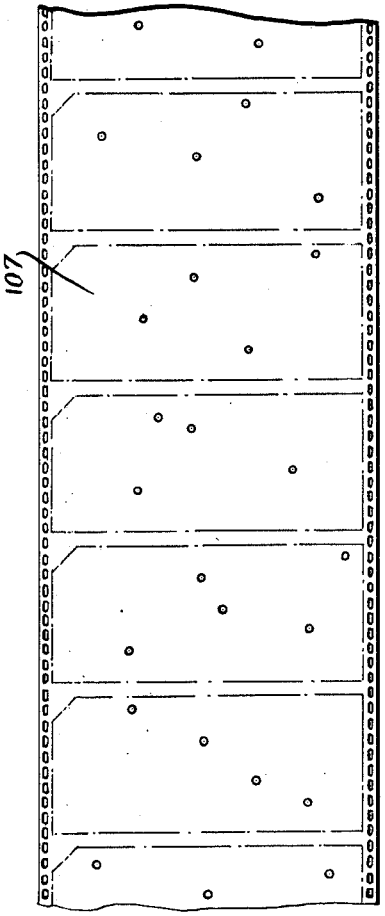
Fig. 7 is a view of a portion of the perforated tape used to control a Hollerith electric tabulating machine in accordance with the present invention.

The present invention has been shown as embodied in a well-known type of tabulating machine such as is described in Letters Patent No. 1,236,481 and No. 1,245,502, however, as will be shown hereinafter, it is capable of adaptation to other types of tabulating machines, for example, a machine similar to the one described in Letters Patent No. 1,379,268 and No. 1,307,740 granted to Clair D. Lake. Since both of the machines described in the cited patents are now well-known in the art, it will be unnecessary to go into a lengthy description of their construction and operation, only such parts being described as may be necessary for an understanding of the invention.

The first five figures of the drawings illustrate one form which the invention may take and the construction shown therein will now be described in detail. The numeral 11 refers generally to a tabulating machine such as the one described in Letters Patent No. 1,245,502 or 1,236,481. Each of the actuators 12 is controlled by means of a group of ten pins 13 normally out of the path of a lug 14 formed in the actuator 12 and is normally held in the position shown in Fig. 3 by a zero stop 15 formed in a plate 16 both ends of which are pivoted to the frame-work as at 16a. There are as many rows of pins 13 as there are columns in a standard record card, the most common standard card having forty-five columns, and each pin is mounted to slide vertically in perforated guide plates 17.

The manner in which the pins 13 operate the plate 16 is fully described in detail in Patent No. 1,236,481 to which reference may be had for a more detailed description.

Each actuator 12 is adapted to drive an associated accumulator wheel 12a of accumulating mechanism fully described in detail in Patent No. 1,245,502 through the medium of gear teeth formed in said actuator which mesh at the proper times with similar teeth in the accumulator wheel 12a. Each sector 12 also controls a conventional type bar designated 12b in Fig. 3 in the manner described in Patent No. 1,245,502.

The guide plates 17 are supported by a frame 18 mounted upon the main frame of the machine over a box-like structure carrying freely slidable rods 20, each of which underlies a pin 13. The rods 20 are guided by parallel plates 21 and the upper and lower ends of each is somewhat enlarged as at 22, the lower enlarged ends being guided by a perforated plate 23 overlying a second similarly perforated plate 24. The two plates 23, 24 are spaced apart a sufficient distance to permit the record tape 25 to pass between them and the holes in the lower plate 24 act as guides for spring pressed pins 26 mounted to slide vertically in two guide plates 27 carried by the vertically reciprocable frame 28, the latter being slidably mounted in vertical guides not shown.

The frame 28 is operated by means of two cams 29 mounted upon the main shaft 30 which have cam grooves 31 cooperating with cam rollers 32 carried by lugs 33 formed in the frame 28. The shaft 30 revolves continuously, therefore, it will be clear that the frame 28, hereinafter to be termed the pin box, will be moved up and down once each revolution with the consequence that any of the pins 26 which pass through perforations in the tape 25 will lift corresponding rods 20 and pins 13.

There is a pivoted plate 16 for each row of pins 13 or as many plates as there are columns in the standard record card, consequently there will be as many actuators 12 as there are columns in the standard record card. It will be noted from an inspection of Fig. 2 that the tape 25 is arbitrarily divided into sections or record fields each of which is the full equivalent of a standard record card, the equivalent record card being shown in broken lines in said figure. The length of the plates 23, 24 is about the same as the length of a standard card therefore it will be clear that the pins 26 will operate over substantially the entire area of the record field as represented by broken lines in Fig. 2.

Each of the pins 13 has a stop portion 34 at its upper end and a bent portion 35 adapted to cooperate with a curved cam surface 36 formed in the pivoted plate 16. Whenever a pin 13 is raised owing to a pin 26 passing through a perforation in the record tape 25, the bent portion 35 will cooperate with the cam surface 36 and rock the pivoted plates 16 to the left (Fig. 4) thereby removing the zero stop 15 which is formed in plate 16 from the path of the lug 14 on the actuator 12 so as to permit the actuator to move to the right and control the printing of the digit represented by the perforation in the tape 25. The foregoing mechanism is fully described in Patent No. 1,236,481 already mentioned, therefore it will be unnecessary to go into further detail as to the functions of the various parts.

The mechanism so far described is now well-known in the art and is the typical construction of the Powers accounting machine. It will be understood that the machine as a whole has been changed only to the extent of modifying the feeding mechanism for the perforated record used to control the machine in order to provide for control by a perforated tape instead of by individual perforated cards.

The record tape 25 is passed between suitable guide rollers 37 and thence between two plates 38, 39, a second pair of plates 40 and between the plates 23, 24 to a feed roller 41, suitable marginal sprocket holes 42 in the tape 25 cooperating with sprocket teeth 43 in the roller 41. Adjacent the feeding roller 41 the tape passes between two plates 44 having openings therein to accommodate the said roller, the function of the plates 44 being to hold the tape 25 in place and prevent accidental displacement of the tape relative to the feeding roller. Preferably the upper plate will be hinged and held in place by a latch in order to permit ease of insertion of the tape. The feeding roller 41 is mounted upon a shaft 45 with which is rigid a gear 46 capable of meshing at the desired time with the teeth of a mutilated gear 47 rigidly mounted upon a cross shaft 48 parallel with the shaft 45. A bevel gear 49 fixed to the shaft 48 meshes with a similar gear 50 fixed to the shaft 30. The bevel gears 49, 50 both have the same number of teeth while the gear 46 and the teeth in gear 47 are so proportioned that the shaft 45 will make one revolution in approximately one-sixth of a revolution of the shaft 30. The feeding roller 41 is proportioned to feed the record tape 25 a distance sufficient to bring a new portion of the tape equivalent to a standard perforated record card into operative relation with the pin box 28 each time the roller makes one revolution, the feeding operation taking place during the time the cam rollers 32 are traveling in the dwells in the cams 29.

In order to satisfactorily use a perforated tape to control a machine of the type just described so as to secure greater flexibility of operation, it is necessary to provide mechanism for disabling the printing and tabulating functions of the machine when certain records occur which it is not desired to tabulate. When record cards are used they may be sorted to eliminate undesired cards, however, this cannot be accomplished when a record tape is used since the record sections are permanently fastened together.

The present invention provides for the skipping of certain records after an analyzing device operatively connected to the tabulating machine reads the perforations representing a specific class or group number and determines that the data corresponding to the particular group involved is not to be tabulated.

The analyzer is carried by a frame 51 which may be reciprocated vertically by means of two eccentric rods 52 having eccentric straps 53 driven by eccentrics 54 carried by shaft 55. A gear 56 mounted upon shaft 55 is driven by a similar gear 57 mounted upon shaft 30, consequently the frame 51 will be drawn downwardly once during each revolution of shaft 30 or once each tabulating cycle. The frame 51 carries two fixed and parallel rods 58 upon which is slidably mounted the analyzer unit 59 for movement in a direction parallel with the direction of motion of the tape 25, the frame of the analyzer unit 59 being carried by ears 60 attached thereto, the shafts 58 passing through holes in said ears. The left hand shaft 58 (Fig. 5) or the rear one (Fig. 1) is provided with notches 61, any one of which notches may cooperate with a lug 62 carried by a slidable plate 63 mounted on the left side plate (Fig. 5) of the analyzer frame. The plate 63 is normally held in the position shown in Fig. 5 by means of a spring 64 and has a finger piece 65. When the finger piece 65 is depressed the lug 62 is withdrawn from the notch 61 with which it may happen to be in engagement and permits shifting the analyzer pins 66 into register with any one of five rows of holes in the plates 38, 39, the holes being disposed crosswise of the plates 38, 39. The five rows of holes just mentioned register with the first five columns of index points of each record section or field analyzed counting from the left (Figs. 1 and 2).

The analyzer unit 59 is substantially like the analyzer illustrated and described in Patent No. 1,476,161 granted December 4, 1923 to W. W. Lasker, consequently only a brief detailed description of its construction and operation will be given herein.

The frame of the analyzer unit 59 is preferably in the form of a box, and contains the analyzer or detector elements 66 which, as stated, are adapted to cooperate with the perforations in the plates 38, 39 in order to feel or detect any perforation which may be in register with any upper and lower alining perforations in said plates. In the present embodiment, the detector elements or pins 66 are arranged in alinement in a row extending transversely from front to rear of the frame 59 lengthwise of the machine and are slidably mounted in openings in a guide bar 59a the ends of which bar are rigidly secured to the plates forming the frame 59.

The upper ends of these pins 66 are formed as vertical connector bars 66a, the upper end of each of which is pivoted, as at 66b, to an intermediate point on a lever 66c, one end of which lever is mounted to rock on a horizontal shaft 66d carried by the frame 59. Each lever 66c is provided at its free end with a latch recess 66e adapted to take position under a transverse latch bar 70 loosely mounted on a pivot bar 70a supported in the frame 59 and to which bar are rigidly connected arms 70b the free ends of which are connected by a bar 69 the arrangement being such as to provide a bell-crank motion on the bar 70a as a fulcrum.

The levers 66c are arranged to rock in the spaces between the teeth or fingers 69a of a guide comb 69b rigidly supported at its ends in any suitable manner by the frame 59. The bar 70a is normally urged toward the ends of the levers by means of a torsion spring 70c surrounding and having one end suitably secured to said bar 70a, and its other end anchored, in any suitable manner, to a collar 70d secured to the bar by a set screw 70e.

Beneath the levers 66c is a transversely extending stop bar 59b mounted rigidly in frame 59 and with which is adapted to cooperate stop arms 59c on the lower sides of the levers 66c, whereby the projecting movement of the pins 66 relative to the carrier or pinbox is limited. Connected to the bar 59b is one end of a spring 66f, the other end of which is connected to one arm of a bell-crank lever 66g, which is fulcrumed at its angle on the pivot 66b heretofore described. The other arm 67 of the bell-crank lever 66g, extends upwardly and is provided on the side toward the bar 69 with an arm 68a having at its end a locking recess 68. The arrangement is such that when the frame 59 is moved toward the plates 38, 39 by the means described, certain of the pins 66 may pass through perforations in the plates 38, 39 and the registering perforations in the tape 25 while others will be arrested and held by the imperforate portions of the tape. One or all of the pins 66 which cannot pass through the tape will be held stationary, resting on the imperforate portion of the tape surface when the frame 59 descends, which will result in the lever 66c attached to any such arrested pin being moved to the position shown in shaded lines in Fig. 5a, which will force its lever 67 upwardly into engagement with the bar 69 the latter being received by a recess 67a. This movement serves to force the arms 70b upwardly (Fig. 5a), thereby causing the bar 70 to be thrown to the right and over the locking recesses 66e on the levers 66c which are connected to those pins 66 which are in line with and have passed thru perforations in the tape, so that these latter pins become rigidly connected to the pin-box and move positively therewith during the movement of the latter toward the tape 25. This rigid connection is for a purpose to be presently described.

The pins 66 may be rendered ineffective to pass through perforations by grasping the end of lever 67 of the pin 66 it is desired to disable, rocking the lever to the right (Fig. 5a) until the lever can be pulled upwardly without moving the bar 69 and then allowing the recess 68 to engage the bar 69 to thereby hold the associated pin 66 in partly elevated position. When the bar 69 is raised by the arresting of any pin 66 due to engagement of the latter with an imperforate portion of the tape 25, the disabled pin will be raised still further by a movement upward relative to the frame 59 and cannot enter any hole which may be present in the tape. Even if no other pin 66 is stopped by the tape the pin which is latched up cannot move far enough to pass through a hole in the tape.

The manner in which the pins 66 may be rendered ineffective is fully described in Patent No. 1,476,161 cited hereinbefore.

The pin 66 which passes through a perforation in the column analyzed moves a slight amount through the perforation then becomes locked by the transverse latch bar 70 in the manner just described. Further downward movement of the analyzer causes the pin 66 to strike a plate 71 carried by arms 72 fixed to a cross shaft 73 thereby rocking the plate downwardly a slight amount. The shaft 73 is journaled in a frame 74 which is fixed to the underside of plate 39 and also has bearings supporting the shaft 55. An arm 75 fixed to the shaft 73 extends downwardly and is adapted to push to the left (Fig. 1) a plunger 76 mounted on a bracket 77 carried by the frame 74. The plunger 76 communicates its leftward movement under the influence of plate 71 to a flexible wire 78 slidably mounted in a flexible tube leading to a tripping plunger 79. The purpose of this construction is to control the release of latches carried by a disk driven by the main shaft 30 in a manner now to be described.

Mounted loosely upon a fixed shaft 80 parallel with the shaft 30 is a disk 81 driven by a gear 82 which meshes with a smaller gear 83 fixed to the main shaft 30, the disk 81 and gear 82 being both fast to a bushing loosely mounted upon the shaft 80. The gear ratio between the gears 82, 83 is such that the disk 81 turns one-third of a revolution with each revolution of shaft 30.

Pivotally mounted upon the disk 81 equal distances from each other and from the center of the shaft 80 are three latches 84, 85 and 86 which are alike in all respects. Each latch has a nose 87 and a lug 88 which is offset from the rest of the latch, that is, the lugs 88 project to the left (Fig. 1) and each normally lies just out of the path of the plunger 79. Each latch 84, 85, 86 has a hook 89 the rear side of which normally abuts against the rear side of a similar hook 90 formed in each of three latches 91 pivotally mounted upon the disk 81. A spring 92 normally holds the latches of each pair shown in the position just described which is the condition of the latches 85 and 86 and the related latches 81. Each latch 81 has a tail 93 adapted to cooperate with a release cam 94 fixed to the shaft 80. The inward movement of each latch 84, 85, 86 under the influence of its spring 92 is limited by a stop pin 95 carried by the disk 81.

Slidably mounted on a bracket 96 supported by the main frame is an arcuate plate 97 which lies in the plane of the noses 87 but is normally out of the path of movement of said noses when they occupy their normal positions with the latches against the stops 95 as shown by the condition of latches 85, 86. The plate 97 is slidable in a direction away from the center of shaft 80 and has a cam surface 98 and a surface 99 concentric with the periphery of disk 81. Cooperating with the plate 97 is a bell crank 100 one arm of which is normally urged in a clockwise direction by means of a spring 101 (Fig. 3) against a lug formed in the edge of plate 97. Pivoted to the other end of bell crank 100 is a link 102 which extends upwardly and is pivoted to an arm 103 fixed to a rock shaft 104 journaled in the tabulating machine frame and parallel with a line drawn through the tips of the zero stops 15 (Fig. 4). Fixed to the shaft 104 is a locking plate 105 which extends to the right (Fig. 3) and overlies the left ends of the pivoted plates 16. The plate 105 is provided with a series of teeth or tongues 106 which are bent downwardly and lie between the left upper edges of plates 16 so that normally the said plates are locked with the zero stops 15 in the path of lugs 14 thereby preventing tabulating and printing operations.

It will be seen, therefore, that the normal condition of the latches 84, 85, 86 and plates 97 and 105 is such that an operation of the tabulating machine is prevented insofar as the tabulating and printing functions are concerned so that the shaft 30 will merely turn idly without effect other than to feed the record tape 25 periodically.

The analyzer 59 is spaced at a distance away from the pin box 28 equivalent to two record fields, that is to say, when the pin box 28 is reading the first record field brought into operative relation thereto, the analyzer 59 will be reading one of the first five columns of the third record field. This spacing is required owing to the necessity of using any of the five columns operated upon by the analyzer 59 for printing an identifying number on the work sheet in the tabulator and also to avoid complicating the construction of the pin box 28 and the mechanism controlled thereby. The purpose of the analyzer 59 is to read the perforations in one of the first five columns which are ordinarily devoted to a group or class number in order to determine whether the record analyzed is to be subsequently tabulated and printed or skipped entirely by the machine. The disk 81 and the three latches 84, 85, 86 are provided to enable the analyzer to control the tabulating machine in the manner desired notwithstanding the fact that the analyzer reads a record field two cycles in advance of the tabulating cycle. In other words, three cycles are required to dispose of a given record field— one cycle for analysis, an idle cycle, and a tabulating cycle.

The operation of the various parts will now be described in detail. It will be assumed that a perforated record tape has been placed in the machine with the perforations in the first five columns of the first field in register with the five rows of perforations in plates 38, 39, the hand wheel of the tabulating machine having been previously turned until the teeth in gear 47 have just become disengaged from the teeth in gear 46, the last named operation having been performed with the tabulating machine driving motor disconnected.

It will also be assumed that the perforations in the first column on the left in each record field are to be analyzed to determine which of said record fields are to be tabulated, and it will be understood that record fields bearing a perforation in the "9" index point position of the first column are to be tabulated. In order to render the analyzer effective only when the record field bears said perforation at "9", each of the latch levers 67 except the extreme right hand latch lever (Fig. 5) will be latched to the bail 69 in the manner described leaving only the said right hand pin 66 free to enter a perforation in the "9" index point position.

As soon as the motor is started the eccentrics 54 will draw the frame 51 downwardly causing the right hand pin 66 (Fig. 5) to enter the perforation at "9" if one happens to be present in the first column of the first record field. The pin 66 passing through said perforation will be locked in the manner described just before the pin strikes the plate 71 so that continued movement of said pin downwardly will effect positive rocking of shaft 73 and arm 75 owing to the pin 66 pushing down on the plate 71. As a result the arm 75 will push the plunger 76 to the left (Fig. 1) thereby forcing the wire 78 through the flexible tube and effecting movement of plunger 79 into the path of the offset lug 88 in the latch 86 (Fig. 3). While the eccentrics are moving the half-revolution necessary to draw the frame 51 completely downward, the shaft 30 will turn a half revolution and, since the ratio of gear 83 to gear 82 is 1 to 3, the disk 81 will move through one-sixth of a revolution so that by the time plunger 79 has been forced completely into the path of lug 88 on latches 84, 85, or 86, the said lug will be immediately behind the plunger 79 or to the left of said plunger as viewed in Fig. 3. The frame 51 will now start to return to its normal position but will move very slowly at first owing to the shape of the eccentrics 54 while the disk 81 will move at a uniform speed which will be greater than the rate of withdrawal of the plunger 79 so that the lug 88 will eventually strike said plunger with the result that the latch will be rocked clockwise (Fig. 3) until the hook 90 drops behind the hook 89 thereby securely holding the latch 86 in its tripped position.

During the first part of the revolution of shaft 30 the pin box 28 will be moved upwardly by the cams 29 but no effect will be produced upon the tabulating machine since no perforations will be present in the portion of the record strip between the pin box and the pins 28 and also because the plate 105 prevents the release of the actuators 12. Near the end of the first revolution of shaft 30 or approximately the last one-sixth of a revolution, the teeth in gear 47 engage the teeth in gear 46 and cause the record tape to be fed one record field to the left (Fig. 1) thereby bringing a new record field into position to be analyzed by the analyzer 59 and moving the record field previously analyzed to a position beneath the plates 40.

The same cycle of events will be gone through as before, the second record field being read by the analyzer 59, and, if a perforation exists in the "9" position of the column analyzed in the second record field, the next latch 84, 85, or 86 passing the plunger 79 will be tripped as before. Near the end of the second cycle the tape 25 will be again fed forward thereby bringing the field first analyzed into position to tabulate the items recorded in said field while the second record field will be moved into idle position between the plates 40. Meanwhile the latch 84 first tripped will have moved approximately two-thirds of the entire circumference of disk 81 into position to bring the nose 87 thereof into contact with the cam surface 88 upon continued movement of the disk. The various parts will now occupy the positions shown in Fig. 3 in which the latch 84 represents the latch first tripped owing to the presence of the "9" perforation in the first field analyzed by analyzer 59; the latch 85 remaining untripped, it being assumed that the absence of a "9" perforation in the second field prevented the tripping of said latch; while the latch 86 will be likewise untripped.

Further movement of the disk 81 will cause the nose 87 of the latch 84 to strike the cam surface 98 just before the pin box 29 starts to rise for the third cycle and consequently the arcuate plate 97 will be forced outwardly thereby rocking the bell crank 100 and causing the plate 105 to rock upwardly so as to remove the teeth 106 from locking engagement with the pivoted plates 16. When any of the pins 26 pass through perforations in the first record field (now in tabulating position) the corresponding pins 13, 20 will be pushed up and the pivoted plate 16 common to each row in which a pin 13 is raised will be rocked to the left (Fig. 4) to disengage the zero stop 15 from the lug 14 in the actuator 12 corresponding to the column in which the perforation appears. The actuators will now be freed and will perform their usual functions so that the amounts corresponding to the various perforations in the first record field will be tabulated.

Near the end of the third cycle the record tape will be again fed forward to bring the second record field into tabulating position and move the fourth record field into position to be read by the analyzer 59. Since the latch 85 was not tripped the plate 105 will not be rocked upwardly and the data in the second record field will not be tabulated. Likewise, the third record field will not be tabulated since the latch 86 was not tripped. After the tripped latch 84 passes from contact with the arcuate plate 97 the tail 93 of the latch 81 will engage the cam 94 and effect disengagement of the hook 90 from the hook 89 with the result that the spring 92 will pull the latch 84 back to normal position against the stop pin 95.

It will be clear that the analyzer 59 determines whether or not a particular record field is to be tabulated and if so, trips one of the latches 84, 85, 86 in the manner described, the tripped latch not being rendered effective to unlock the tabulating machine until the analyzer 59 has read an intervening record field and is about to read a third record field.

So far the invention has been described in connection with a Powers type of accounting machine, however, it may be desired to embody the invention in a Hollerith type of tabulating machine as described generally in the Lake patents mentioned before herein. Figs. 6 to 9 illustrate the invention as embodied in a Hollerith tabulating machine and will now be described in detail.

The Hollerith electric accounting and statistical machine analyzes records while they are in motion instead of while they are at rest as is the case with the Powers tabulating machine, consequently the tape used to control a Hollerith tabulating machine must be moving continuously. The tape must also be modified somewhat since the analyzing brushes of the tabulating mechanism all sweep simultaneously across the record field from the "9" index point positions to the "12" index point positions consequently the record fields on the tape 107 must be arranged side-by-side as in Fig. 7 instead of end-to-end as is the case in Fig. 2.

The tape 107 is passed from a suitable supply roll, between feeding rollers 108 carried by shafts 109, between parallel guide plates 110, over a metallic contact roll 111 which is insulated from the framework, between parallel guide plates 112, over a contact bar 113, and over a feed roller 114 similar to the feed roller 41, hereinbefore described, to a storage roll. Adjacent the feed roller 114 the tape 107 is guided by means of a pair of plates 115 similar to the plates 44. The roller 114 is driven in the direction of the arrow (Fig. 6) by means of a shaft 116 carrying said roller and driven by the main shaft of the tabulating machine. The shaft 116 is geared to make one revolution per tabulating cycle.

Overlying the contact bar 113 is a series of brushes 117 underneath which passes the tape 107, there being a separate brush 117 for each column in the record field. These brushes are the usual Hollerith analyzing brushes and are connected to the printing magnets and the counter clutch magnets in exactly the same manner disclosed in the Lake patents cited hereinbefore. Cooperating with the contact roll 111 is a single brush 118 carried by a brush holder 119 which is capable of being set to read any desired column in the record fields. The brush holder and its manipulating mechanism may be of the form disclosed in Patent No. 1,741,985, granted to E. A. Ford. The purpose of the brush 118 is to read the perforations representing the class or group number and determine if the record field read is to be subsequently tabulated.

The shaft 116 has fixed thereto a gear 120 meshing with a gear 121 loosely mounted upon a stub shaft 122. Fixed to the gear 121 is a disk 123 identical in all respects to the disk 81 and having three latches 124 similar to latches 84, 85, 86. Cooperating with the latches 124 is an arcuate plate 125 which is similar to the plate 97 and is arranged to close a pair of contacts 126 whenever the plate is pushed outwardly by a latch 124 which may be tripped. A plunger 127 is arranged to be pushed into the path of offset lugs 128 similar to the lugs 88, a magnet 129 being provided for this purpose. The magnet 129 is controlled by the brush through a circuit similar to the circuit disclosed in Patent No. 1,741,985 cited hereinbefore. A release cam 130 is provided which is fixed to the shaft 122 and is similar in construction and purpose to the cam 94.

Mounted upon the shaft 116 or on a shaft driven synchronously therewith is a commutator device 131 similar to the commutator device shown and described in Patent No. 1,741,985 aforementioned. This commutator device has a common brush 132 (Fig. 8) connected to the left current supply wire 133 and a brush 134 which sweeps over the commutator bars 135. The commutator has a continuous contact ring 132a with which the bars 135 may be made current conducting at will as explained in said Patent No. 1,741,985 and upon which bears the common brush 132. Associated with the commutator 131 is a second commutator having a segment 136 provided with a current connection to a continuous contact ring 132c with which co-operates a brush 132b similar to brush 132 and connected to the latter.

The brush 118 is connected in series with the brush 134, a brush relay 138, and the magnet 129, to the right current supply wire 139. When relay 138 is energized it closes contacts 138a and establishes a holding circuit for itself and the magnet 129 through the brush 137 and segment 136 to the left current supply wire 133. In Fig. 8 the circuits for the tabulating machine have been only partially indicated since they are now well known. It is sufficient to say that the brushes 117 correspond to the usual lower brushes of the tabulating machine, the reference numeral 140 indicating the usual counter magnets. It will be understood that the magnets 140 form part of the usual Hollerith accumulating mechanism, one form of which is described in detail in Patent No. 1,307,740 and, when energized by the differentially disposed perforations in the tape 107, control the accumulating mechanism in accordance with said perforations. The usual printing circuits are established by brushes 117 through printer magnets 140a (Fig. 8). These printer magnets control the operation of type bars as in Patent No. 1,379,268. It will be observed that the contacts 126 are in circuit with the common current connection to the contact bar 113 and are normally open so that under ordinary circumstances the machine is prevented from tabulating and can only tabulate when the contacts 126 are closed.

Referring to Fig. 6, the brushes 117, 118 are spaced apart a distance equal to the length of tape covered by two record fields so that when brushes 117 are resting upon, say the "9" index-point positions, of the first field of the tape, brush 118 will be resting upon a "9" index-point position in a column of the third field. The effect is to sense the holes in the first and third fields of any group of three together.

The operation of the mechanism just described will now be described briefly.

It will be assumed that only record fields which have a perforation in the "3" index position are to be tabulated. In order to accomplish this result all of the commutator bars 135 except the "3" commutator bar will be made non-conducting with respect to the continuous contact ring 132a in the manner described in Patent No. 1,741,985. Thus it will be clear that no current can be established through the commutator 131 except when a perforation appears in the "3" index point position of the column devoted to the class or group number.

The tape 107 will be inserted in the machine and adjusted preferably by alining a mark made in the tape with a similar mark made in the feeding roller 114, in order to insure that the proper time relationship will exist between the tape 107 and the brushes 117. The tabulating machine will be started in the usual manner by depressing the starting key which will cause the shaft 116 to turn thereby feeding the tape 107 in the direction of the arrow, Fig. 6.

When the brush 118 encounters a perforation in the "3" index point position of the column devoted to the group or class number, a current flow will be established as follows: left current supply wire 133, common brush 132, commutator bar 135 in the "3" position, brush 134, contact roll 111, brush 118, brush relay 138, and magnet 129 to the right current supply wire 139. Energization of the magnet 129 forces the plunger 127 into the path of the offset lug 128 in one of the latches 124. Closure of contacts 138a by the relay 138 establishes a holding circuit for the magnet 129 and the relay 138 through the brush 137, segment 136, continuous contact ring 132a, common brush 132b to the left current supply wire 133. Through the remainder of the cycle devoted to the particular record field under consideration the magnet 129 will remain energized, consequently the disk 123 will carry the offset lug 128 of one of the latches 124 past the plunger 127 and, as a consequence thereof, the latch will be tripped in exactly the same manner as the latch 84 was tripped, as previously described. Nothing will happen for the time being since the tripped latch must move through approximately one-third of the circumference of the disk 123 before its nose can strike the arcuate plate 125. At the end of the record cycle the segment 136 will break contact with the brush 137 and the holding circuit through the magnet 129 and relay 138 will be broken, consequently the plunger 127 will be drawn out of the path of the next latch.

The same cycle of events will be repeated for the second record field analyzed by the brush 118 and magnet 129 will be energized as before, provided, of course, there is present the perforation in the "3" index point position. While the brush 118 is reading the perforations in the column devoted to the group or class number in the second record field, the first record field will be moving toward the brushes 117. About the time the "9" index point position of the first record field read by the brush 118 comes under the brushes 117 the tripped latch 124 will be in position to engage the arcuate plate 125 so that slightly before the brush 117 actually reaches the "9" index point position of the first field the arcuate plate 125 will close the contacts 126 thereby connecting the common contact 113 to the line through the usual relays and cam contacts. Thereafter the perforations in the first record field will become effective to control the tabulating machine in the usual fashion to accumulate the amounts on the record field and print them upon the work sheet.

During the time the first record field is approaching the brushes 117 the second record field will be passing the brush 118. If the second record field contains a perforation in the "3" index point position, a second latch 124 will be tripped so that when the second record field arrives under the brushes 117 the arcuate plate 125 will again be moved outwardly to again close the contacts 126 so that the second record field will likewise be tabulated and printed. If no perforation was present in the second record field the latch 124 will not be tripped consequently when the second record field arrives under the brushes 117 the contacts 126 will not be closed and the second record field will not be tabulated. It will thus be seen that there is a delay of approximately one full cycle before a record field containing a perforation in the "3" index point position read by the brush 118 becomes effective through the brushes 117 to control the operation of the tabulating machine.

The brushes 117 and 118 are spaced apart a distance sufficient to cause a delay of one tabulating cycle and are so spaced that the brushes will all read corresponding index point positions simultaneously. After the tripped latch 124 has passed from contact with the arcuate plate 125, the release cam 130 will engage the tail of the holding latch and permit the springs connecting the two latches to restore them to their normal positions with the nose of the latch out of effective position.

It is thought that the foregoing brief description taken in connection with the description of the mechanism illustrated in Figs. 1 to 5 will be sufficient to enable those skilled in the art to understand the construction and operation of the modification illustrated in Figs. 6 to 9.

The present invention has been shown and described with reference to a specific form of embodiment and applied to a particular type of accounting machine, however, it is understood that it is not limited to the precise form shown as it may be modified in details or applied to other types of accounting machines as well in order to suitably adapt it to the varying conditions met in practice, all such modifications and adaptations falling within the scope of the following claims.

I claim:

1. In a machine controlled by a record tape comprising spaced record fields each containing item designations and item classification designations, the combination of analyzing means for the item designations in the record fields, a second analyzing means for the classification designations adapted to sense the classification designations of each field a predetermined number of machine cycles prior to analysis of the same record field by the first analyzing means, means for feeding the tape to both analyzing means, means for rendering said second named analyzing means effective to sense only predetermined classification designations, accumulating mechanism controlled by the first named analyzing means, a device for rendering the first named analyzing means ineffective to control said accumulating mechanism; a rotary timing member rotated in synchronism with the feeding of the tape, said member having a plurality of elements, each settable to control the operation of said device, said elements corresponding in number to the number of machine cycles required for analysis of any given record field by both analyzing means; and means controlled by the second named analyzing means for setting one of said elements on the occurrence of classification designations which the second named analyzing means is effective to sense.

2. In a machine controlled by a record tape comprising spaced record fields each containing item designations and item classification designations, the combination of analyzing means for the item designations in the record fields, a second analyzing means positioned to sense the classification designations of each field a predetermined number of machine cycles prior to analysis of the item designations in the record fields by the first analyzing means, means for feeding the tape to both analyzing means, a constantly rotating main shaft for operating the tape feeding means, means for rendering the second named analyzing means effective to sense only predetermined classification designations, accumulating mechanism connected to be controlled by the first named analyzing means, a device for rendering the first named analyzing means ineffective to control said accumulating mechanism; a timing member comprising a disc rotated by said shaft in timed relation to the feeding of the tape, said disc having a plurality of settable elements spaced equal distances on the periphery of the disc for operating said device, said elements corresponding in number to the number of machine cycles required for analysis of any given record field by both analyzing means; and means controlled by the second named analyzing means for setting one of said elements on the occurrence of classification designations which the second named analyzing means is effective to sense.

3. In a machine controlled by a record tape comprising spaced record fields each containing item designations and item classification designations, the combination of electrical analyzing brushes for the item designations in the record fields, a second analyzing brush for the classification designations positioned to sense the classification designations of each field a predetermined number of machine cycles prior to analysis of the item designations in the record fields by the first analyzing brushes, means for feeding the tape past both analyzing brushes, a drive shaft for the tape feeding means, a selector device operated by said shaft and manually settable to render the second analyzing brush effective to respond to only predetermined classification designations, accumulating mechanism including several accumulator control circuits connected to be controlled by the first analyzing brushes, a circuit closer for said circuits; a timing member driven by said shaft and rotated in synchronism with the feeding of the tape, said timing member having a plurality of elements each settable to cause the operation of said circuit closer, said elements corresponding in number to the number of machine cycles required for analysis of any given record field by the respective analyzing brushes; and means controlled by the second analyzing brush for setting one of said elements on the occurrence of classification designations which the second analyzing means is effective to sense.

4. In a machine controlled by a perforated tape having item and item classification designations, separate means to sense the item and classification designations, an accumulator having an accumulator circuit connected to the item sensing means for accumulating amounts under control of an item designation, means for closing said circuit, a rotary timing member having settable means for operating the circuit closing means, a selector device settable to correspond with predetermined classification designations, and means controlled by the classification sensing means and the selector device for setting the settable means in accordance with predetermined classification designations.

5. In a machine controlled by a record strip having item designations and item classification designations, separate means to sense the item and classification designations, an accumulator, a series of accumulator magnets, control circuits therefor, said circuits being connected to the item sensing means whereby to control the accumulator magnets in accordance with the item designations, a rotary timing member having a series of settable elements, circuit control means in said circuits actuated by said settable elements when set, a selector device connected to the classification sensing means and settable to correspond with predetermined classification designations, and means jointly controlled by the classification sensing means and the selector device for setting the settable means.

6. In a machine controlled by a perforated record having item designations and item classification designations, separate means to sense the item and classification designations, an accumulator, means controlled by the item sensing means to enter amounts in the accumulator, a rotary timing member having a series of settable control elements movable from an ineffective to an effective position, accumulation control means for rendering the entering means effective and ineffective, said settable elements being movable past said accumulator control means when said member rotates and said elements when set to effective position actuating the accumulator control means to effective position; means to set said elements to effective position as the timing member rotates, and a selector device connected to the classification sensing means and settable to correspond with predetermined classification designations for causing the setting means to operate only when predetermined classification designations are sensed.

7. In a machine controlled by a record tape comprising spaced record fields each containing item designations and item classification designations, the combination of electrical analyzing brushes for the item designations in the record fields, a second analyzing brush for the classification designations positioned to sense the classification designations of each field a predetermined number of machine cycles prior to analysis of the same item designations in the record fields by the first named analyzing brushes, a selector circuit controlled by the second analyzer brush, means for feeding the tape past the analyzing brushes, a constantly rotating main shaft for operating the tape feeding means, a manually settable selector device for rendering the second analyzing brush effective to close the selector circuit only on the occurrence of predetermined classification designations, accumulating mechanism having an accumulator control circuit connected to be controlled by one of the first named analyzing brushes, a circuit closing device in the accumulator circuit; a timing member operated by said shaft and comprising a disc rotated in synchronism with the feeding of the tape, said disc having a plurality of settable operating elements spaced equal distances on the periphery of the disc for causing the operation of said circuit closing device, said elements corresponding in number to the number of machine cycles required for analysis of any given record field by both analyzing brushes; and means in the selector circuit and controlled by the second analyzing brush for setting one of said elements in a position to operate said circuit closing device to close the accumulating control circuit when records bearing the predetermined classification designations are sensed by the first named brushes.

8. In a machine controlled by a record strip having both item designations and item classification designations, means to feed said strip, means to sense the item designations, means to sense the classification designations in advance of the sensing of the item designations by the item sensing means, accumulating mechanism controlled by the item sensing means, means to prevent accumulation of items by the accumulating mechanism, a movable member, means to move said member in step with the record strip, a plurality of elements mounted on the movable member to travel therewith, said elements being settable to positions to subsequently disable the preventing means, means for setting the settable element when the classification designations are sensed, and a selector device presettable to correspond with the predetermined designations, said selector device cooperating with the classification sensing means to cause the setting means to set the settable element when the classification designation sensing means senses the predetermined designations.

9. In a machine of the class described, means to sense the item designations, item recording mechanism controlled by the item sensing means, means to prevent recording of items by the recording mechanism, a record strip having both item designations and item classification designations, means to feed said strip, means positioned to sense the classification designations in advance of the sensing of the item designations by the item sensing means, a movable member, means to move said member in step with the record strip, elements mounted on the movable member to travel therewith, each of said elements being settable to a position to subsequently disable the preventing means when the item designations identified by predetermined classification designations are sensed by the item sensing means, means positioned to set one of the settable elements when the classification designations are sensed, and a selector device presettable to correspond with the predetermined designations, said selector device being operative to cause the setting means to set the settable element when the classification designation sensing means senses the predetermined designations.

10. A record controlled machine comprising means to feed a record strip having record fields containing juxtaposed item and item classification designations, spaced sensing means, one for sensing the item designations and the other for sensing the classification designations, said sensing means being spaced along the record strip whereby the classification sensing means senses classification designations before the item sensing means senses the juxtaposed item designations, mechanism controlled by the item sensing means, a device for rendering said mechanism operative or inoperative under control of the item sensing means, a rotary timing member having several elements each settable to a position to actuate the said device, each of said elements corresponding to one of a connected series of record fields, an element projectable into the path of the settable elements to set same to effective position, means for driving the rotary member whereby one of said elements is brought to a position to be set by the projectable element for each record sensed by the classification sensing means, means controlled by the second analyzing device for causing the projection of the projectable element into the path of the settable elements preparatory to setting one of said elements, and a presettable selector device for rendering the classification sensing means effective to cause the operation of the means for causing projection of the projectable element, said selector device being settable to cause the projectable element to operate in response to predetermined classification designations and to be inoperative for other classification designations.

LYNUS CLYDE REYNOLDS.